UNITED STATES PATENT OFFICE.

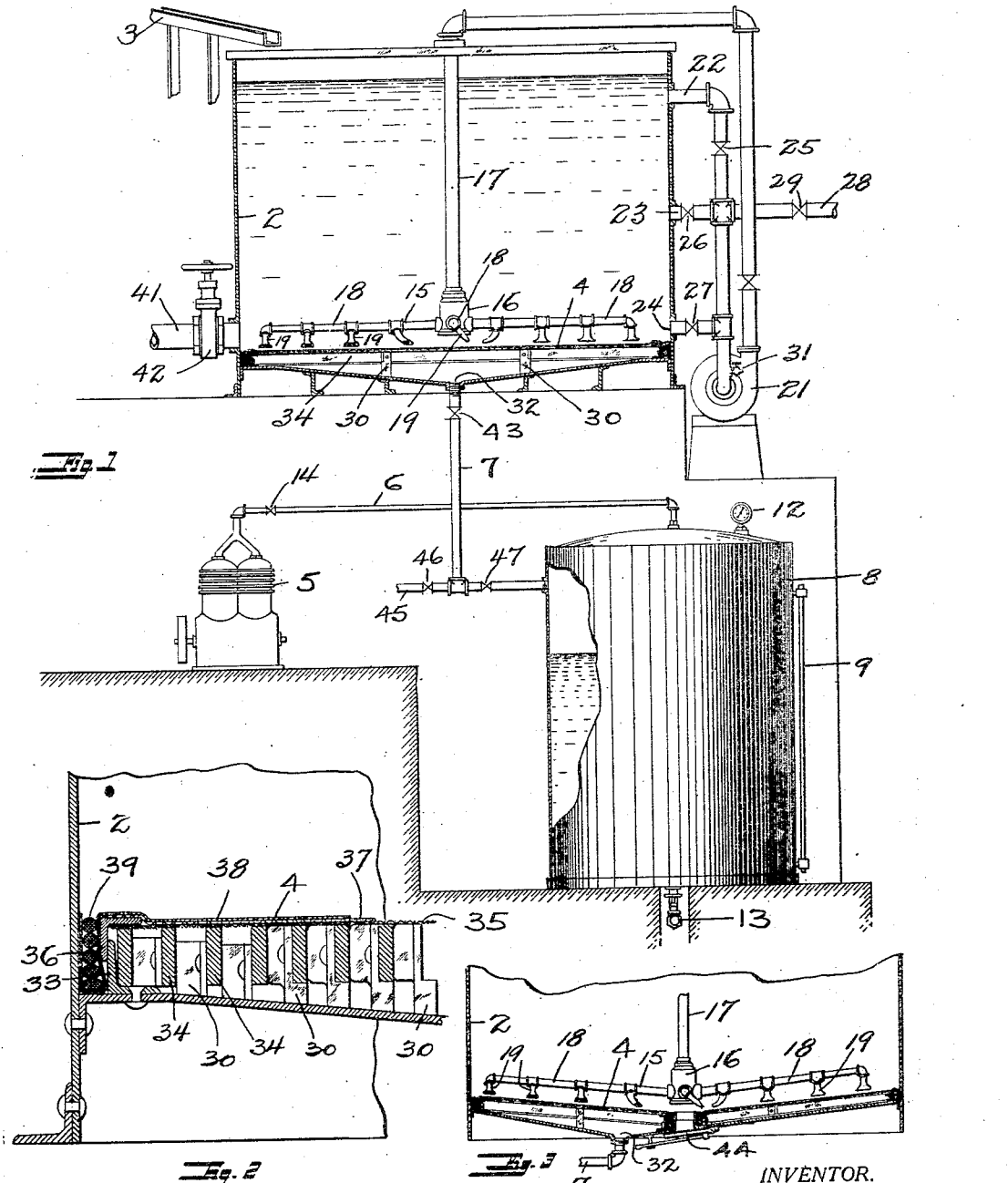

ALBERT E. VANDERCOOK, OF ALAMEDA, CALIFORNIA, ASSIGNOR TO CALIFORNIA MACVAN CO., OF SAN FRANCISCO, CALIFORNIA, A CORPORATION OF CALIFORNIA.

APPARATUS FOR TREATING MIXTURES OF LIQUIDS AND SOLIDS.

1,135,080.

Specification of Letters Patent. Patented Apr. 13, 1915.

Application filed March 9, 1914. Serial No. 823,507.

*To all whom it may concern:*

Be it known that I, ALBERT E. VANDERCOOK, a citizen of the United States, and a resident of the city of Alameda, county of Alameda, and State of California, have invented certain new and useful Improvements in Apparatus for Treating Mixtures of Liquids and Solids.

The invention relates to an apparatus for treating mixtures of liquids and solids or semi-solids such as are encountered in metallurgical and manufacturing operations. The apparatus is particularly useful in treating ore pulps and slimes in metallurgical operations, and I will so describe it herein, but it is to be understood that the invention is not limited to metallurgical operations, but may be employed in other and manufacturing processes in which slimes, pulps or similar mixtures of solids and liquids are encountered.

The objects of the invention are many and diversified and I shall attempt only to state briefly a few of these objects.

One of the objects of the invention is to provide an apparatus for filtering or separating the liquid content of a mixture of the nature of a pulp or slime from the solid or semisolid content without forming a cake of the unfilterable material.

Another object of the invention is to provide a filtering apparatus in which the filtering medium is continually swept by a plurality of streams of the material to be filtered.

The invention possesses other objects and advantageous features, which, with the foregoing, will be set forth at length in the following description, where I shall outline in full one form of the apparatus of my invention, which I have selected for illustration in the drawings accompanying and forming part of the present specification. The novelty of the invention will be included in the claims succeeding said description, and in view of the fact that this invention is basic in nature, I desire the claims to be construed in their broadest sense. From this it is to be understood that I do not limit myself to the showing made by said drawings and description, as I may adopt many variations in the apparatus within the scope of my invention as set forth in said claims.

In view of the departure from accepted practice in the present invention, and of the vast importance of the results obtained thereby, it is deemed necessary to a full disclosure and a proper understanding of the significance of the apparatus hereinafter described to premise the description of the apparatus by clearly indicating the nature of the problems involved.

As I have stated hereinbefore, this invention is applicable to metallurgical and other processes, but since I am more familiar with metallurgical processes than with the other processes, I will describe it in such connection, but the fact that I describe the invention in connection with metallurgical operations is not to be considered as limiting the use thereof to such processes, since I can conceive of its use in many other processes. In the metallurgical field it is particularly advantageous in connection with the cyanid process, for separating the value bearing cyanid solution from the ore pulp or slimes, but may be used in any process in which liquids and solids or semisolids in the nature of pulps or slimes are to be separated, either to obtain the solids or semisolids or the liquid. In the cyanid process, the ground or pulverized ore or pulp containing the gold, silver and other values is mixed with a cyanid solution which dissolves the gold, silver and other values and then the value bearing solution is separated from the remaining solid and semisolid material, so that the solution may be subjected to further treatment for the recovery of the values therefrom. The cyanid bearing pulp or slimes, and by this I mean the mixture of the finely ground or pulverized ore with the cyanid solution, has heretofore been agitated or stirred or mixed in one vessel for a sufficient length of time, depending upon the characteristics of the ore, to accomplish the solution of the values. From this vessel the mass of pulp or slime has been conveyed directly or indirectly to another vessel or container which constitutes a filter, and in which the solid or insoluble material is deposited on filtering surfaces and from which the value bearing cyanid solution has been withdrawn for subsequent treatment. In the filtering process as heretofore practically accomplished, in the filtration of slimes the unfilterable material is deposited on the filtering medium in the form of a cake, which builds up on the filtering surface. The liquid is forced through the filtering medium and the cake by means of a difference in pressure on opposite sides of the filtering medium, and this operation may be accomplished in two ways, that is, either by forcing the liquid through or by drawing or sucking it through. These two methods of operation have produced suction filters and pressure filters, but in so far as the general filtering operation is concerned, the two types of filters operate to filter in the same manner, that is, by forming a cake of the unfilterable material on the filtering surface. It is evident that the formation of the cake increases the resistance to filtration and reduces the rate at which the liquid may be withdrawn, without producing any advantageous effects in so far as the filtering is concerned. In fact, this law of nature is the law upon which filter presses of the present time operate, since otherwise uniformity in thickness of the cake would not be obtainable. The increasing thickness of the cake at any point greatly reduces the rapidity of filtration at that point, so that the cake is built up uniformly. Since the presence of the cake greatly reduces the rapidity of filtration, it is evident that the efficiency of cake forming filters must necessarily be very low and since all practical slime filters are cake forming filters, it follows that the method of filtering now in use is capable of vast improvement. This improvement I have made by providing a filter in which no cake is formed. Further than this, after the cake has been formed, it must be removed from the filtering medium, after it has been washed, and the proper removal of the cake necessitates generally, the use of a large amount of water, which in regions where water is scarce, is a large item of expense. By my process, since no cake is formed, it is evident that the employment of a large amount of sluicing water is not necessary, thereby providing another feature of advantage over the filters now in general use.

Having stated the present status of the filtering art, prior to my invention, it is believed to be advisable to set forth some of the disclosures of the present invention.

This invention discloses for the first time a practical apparatus for filtering ore pulp or slimes or similar masses in which the formation of a cake is obviated and also discloses for the first time a filtering apparatus in which the unfilterable material is not deposited upon the filtering medium during the filtering operation.

According to my invention I prevent the formation of a cake on the filtering medium, by continually directing a plurality of streams of the material to be filtered against the filtering medium. The nozzles from which these streams issue are preferably movable over the filtering medium so that the moving streams sweep the entire surface of the filtering medium and remove any deposit therefrom as soon as it is deposited. The material which constitutes the streams which are forcibly directed against the filtering medium is withdrawn from the mass of material to be filtered in the filtering vessel and is forced back into the vessel through the nozzles. By preventing the unfilterable material from forming in a cake on the filtering medium, the material remains in the form of a pulp and therefore may be more readily removed or flowed from the filtering vessel after the filtering and washing operations have been completed. In cake forming filters the cake contains between 30% and 50% of moisture, but by maintaining the material in the form of a pulp, the moisture content may be reduced as low or lower than when a cake is formed. In the cake forming filter there is a certain thickness of cake beyond which it is not possible to filter, but in the present process it is possible to filter when a much deeper body of the thick unfilterable material is present, thereby rendering the discharge of the unfilterable material less frequent.

The process and the apparatus are particularly designed to be used in connection with ore pulps or slimes which consist of a mixture of finely pulverized ore and liquid, and in the following description and claims I shall refer to the material to be filtered as pulp, it being understood that the word "pulp" includes slimes and covers any material which when filtered without agitation will form a cake on the filtering medium.

In the accompanying drawings I have outlined a simple form of the apparatus of my invention, but it is to be understood that the apparatus is capable of many variations and modifications, and that the invention is not limited to the apparatus shown.

In said drawings: Figure 1 is an elevation of one form of the complete apparatus, the filtering vessel being shown in section. Fig. 2 is a section of a fragment of the filtering surface. Fig. 3 is a vertical section of a modified construction of the bottom of the filtering vessel.

The apparatus illustrated comprises a cylindrical tank 2 into which the pulp or material to be filtered is charged through a pipe or launder 3. Arranged in the bottom of the tank, which bottom may be slightly conical, is a filtering surface or medium 4 through which the liquid is drawn. A lowering of pressure on the under side of the filtering medium 4 is produced by the vacuum pump 5, which is connected to the tank 2 below the filtering medium, by means of the pipes 6 and 7. Interposed between the tank 2 and the pump 5 is preferably arranged a sealed tank 8, into which the filtered liquid passes, but the liquid and air may be directly drawn through the pump when desired, thereby eliminating the tank 8. The pipe 6 is connected to tank 8 at the top, so that the tank 8 may fill with liquid without causing it to be carried over to the pump. The liquid or solution tank 8 is preferably provided with a gage glass 9, which indicates the height of the liquid therein, and with a pressure gage 12, which indicates the condition of vacuum obtaining therein. When the tank 8 becomes full or substantially full, the outlet 13 is opened, the vacuum therein is released, and the tank empties. The pump 5 need not be operated continuously, but may be operated only until a sufficient vacuum is produced in the tank 8, after which the valve 14 in the pipe 6 may be closed and the pump stopped.

Means are provided for forcibly directing a plurality of streams of material against the surface of the filtering medium to remove the unfilterable material therefrom as soon as it is deposited, and thereby prevent the formation of a cake on the filtering medium. The means for directing the streams against the filtering medium is preferably rotatable, so that the streams sweep the entire surface of the filtering medium, thereby intermittently removing the deposited material from any particular portion of the medium. The stream directing means consists preferably of a rotatable structure 15 mounted by means of a suitable bearing 16 upon the centrally depending conductor 17. The bearing 16 is of the submerged water proof frictionless type as disclosed in my prior application, Serial No. 800,721, filed in the Patent Office on November 13, 1913. The rotating structure comprises a plurality of hollow arms 18, each provided with a plurality of downwardly directed inclined nozzles 19, through which the pulp or liquid is forcibly discharged against the filtering medium. The nozzles are spaced differently on each arm so that every portion of the filtering surface is insured of a cleaning during the rotation of the structure. The nozzles are also broadened or flattened at their discharge ends so that the pulp is discharged in a broad stream which sweeps a greater area of the surface of the medium, than if the streams were not spread. The nozzles are preferably inclined in the same general direction with regard to the arms, so that the reaction of the issuing jets or streams will cause the structure to revolve, thereby obviating the necessity of any separate rotating means. The nozzles on the inner ends of the arms are preferably curved so that the streams issuing therefrom sweep that portion of the filtering medium lying below the bearing to prevent the accumulation of unfilterable material at that point. The liquid or pulp which discharges from the nozzles is drawn from the tank 2 and is forced downward through the conductor 17 by means of the centrifugal pump 21, which is preferably arranged below the level of the filtering medium. By virtue of the down flow of pulp or liquid to the rotatable structure, the pressure of the pulp or liquid being circulated exerts itself downwardly on the bearing, thereby preventing the unseating of the structure. For this reason I am able to employ a higher pressure on the circulating liquid and thereby produce a comparatively rapid rotation of the structure. The speed of rotation varies to some extent with the length of the arms and with three foot arms, I have usually operated at a speed of twenty-five revolutions per minute. The rotatable structure is usually constructed with four arms and the rapid rate with which these arms and their corresponding nozzles follow each other over the surface of the filtering medium, prevents the deposit of any unfilterable material thereon. The suction side of the pump 21 is preferably connected to the tank 2 at a plurality of levels, by the pipes 22, 23, and 24, which are provided respectively with valves 25, 26 and 27, so that the pulp or liquid may be withdrawn from different levels. The lower pipe 24 is arranged within the lower third of the tank and preferably below the level of the unfilterable material remaining when the filtering operation is completed. A pipe 28 provided with a valve 29 is connected to the pump suction pipe and is utilized in introducing washing liquid or sluicing water. A cock 31 on the pump suction pipe is employed for admitting air or other gas to the circulating pulp, so that the pulp in the tank 2 may be thoroughly aerated or treated. When the pump 21 is operating and the cock 31 is open, air is drawn into the pump and discharges from the nozzles, whence it bubbles up through the pulp and on account of the circulation of the pulp and the movement of the nozzles the air is thoroughly disseminated in small bubbles throughout the entire pulp.

The bottom of the tank 2 may be sloped or inclined toward the filtrate discharge opening 32, so that the filtrate will readily flow from the tank. The filtering medium may be of any desirable or suitable form, and I do not limit myself to the form shown herein. In such form there is secured to the bottom of the tank adjacent the periphery thereof an angle iron 33 bent into circular form and arranged concentrically with respect to the tank. Resting on the horizontal leg of the angle iron are a plurality of spaced metallic bars 34 arranged parallel to each other and extending across the tank. These bars are provided with supports 30 intermediate their ends which bear against the bottom of the tank and hold the bars spaced and upright. Arranged on the top of the bars is a layer of wire netting 35. Overlying the edges of the bars and the netting is a circular angle iron 36, the vertical leg of which lies adjacent or in contact with the vertical leg of angle iron 33. Overlying the wire netting and the angle iron 36 and projecting beyond the angle iron 36 is a circular sheet of burlap 37, upon which is superposed a sheet of canvas or other material 38. The joint between the canvas and the side of the tank 2 may be sealed by calking with rope 39 or other fiber. It is to be understood that this describes one way in which the filtering medium may be constructed, and that I do not limit myself to such construction as others may readily suggest themselves and may be employed without departing from the spirit of my invention.

The unfilterable material or pulp may be removed from the tank 2 by sluicing it through the discharge pipe 41 which is provided with a valve 42. The filtered liquid discharges through the pipe 7, which is provided with a valve 43. Another form of unfilterable material discharge is shown in Fig. 3, in which the surface of the filtering medium is annular in shape and slopes toward a central discharge opening which is controlled by a gate 44.

When the tank is charged with pulp or slimes, and the canvas is new, some of the liquid may percolate through the canvas and this liquid often passes through in a muddy condition. It is not desirable to flow this muddy liquid into the solution tank 8, and for that reason a branch pipe 45 provided with a valve 46 is arranged on the discharge pipe 7, and a valve 47 arranged below the branch, so that the initial flow of liquid may be diverted and returned to the tank 2. As soon as the canvas becomes thoroughly wetted the liquid passes through clear and is directed to the tank 8.

In treating some slimes, particularly those of a colloidal or gelatinous nature, a small amount of the slimes may become embedded in the pores of the canvas and retard filtration to some extent. When such a condition is noted, the valve 47 may be closed and air or water under pressure introduced into the discharge pipe 7, as for instance, through the conductor 45. This causes a return or backward passage of the air or water through the canvas, releasing the material in the pores, which is then swept away by the moving jets. The canvas is again perfectly clear and the filtering operation may be continued.

The operation of the apparatus is as follows: The pulp, consisting generally in metallurgical operations of a mixture of ground or pulverized ore and water or solution, usually cyanid solution in the nature of a slime, is charged into the tank 2, submerging the filtering medium and usually until the tank becomes nearly full. After the pulp containing the cyanid solution has been charged into the tank and any necessary preliminary operation has been completed, the pump 21 is started, drawing pulp from the tank and discharging it through the nozzles 19. These streams of discharging pulp are directed against the filtering medium and sweep the entire surface of the filtering medium and prevent the settlement of the heavier particles of the ore thereon, thereby maintaining it clean. This recirculation of the pulp and the agitation produced thereby brings the ore particles into recurrent intimate contact with the cyanid solution and accomplishes a rapid solution of the values, which is more efficient since all of the particles of the pulp and particularly the larger and heavier particles are held in suspension. During this operation, the air cock 31 may or may not be opened, depending upon whether or not it is advisable to aerate the pulp. After the solution of the values in the cyanid solution has been accomplished to a suitable or proper extent, the valve 39 between the solution tank 8 and the solution outlet of the tank 2 is opened and a lowering of pressure produced below the filtering medium. This lowering of pressure may be produced by previously exhausting the tank 8 or by starting the air pump 5, and the liquid content of the pulp is forced through the filtering medium and conducted to the tank 8. During the filtering operation the pump 21 is continuously operated and the jets of pulp discharging from the nozzles 19 against the filtering surface, keep said surface clean and prevent the formation of a cake thereon, regardless of the fact that the filterable material is passing through the filtering medium. By thus maintaining the filtering medium clean, I find that the filterable material or liquid, passes through the medium with fair rapidity due to the weight of the pulp in the tank, even when there is little or no reduction of pressure below the medium. At the beginning of the filtering operation, the recirculating pulp is withdrawn from the tank 2 through the pipe 22 and as the level thereof lowers, it is withdrawn through the successively lower pipes, until the desired filtration has been accomplished. The pulp may be aerated during the filtering operation by opening the air cock 31 and although the air is projected from the nozzles with the pulp, against the filtering surface, no air is drawn through the filtering medium. The filtering operation may be carried on in several ways. The tank may be charged with pulp and the filtering operation carried on until the desired amount of filterable material has been removed, leaving the unfilterable material contained in the charge, or pulp may be continuously or intermittently added to the tank during the filtering operation. The present apparatus is capable of operating with a much deeper layer of unfilterable material than cake forming filters and for this reason it is possible to add pulp to the tank as the filtering operation is carried on, so that after the filtering operation is completed, a deep mass of unfilterable material is present. When the filtering operation is completed, the unfilterable material still contains some liquid, which is usually the valuable element, and it is desirable to recover this valuable liquid. This is accomplished by introducing wash water into the tank through the pipe 28, the pump, and the nozzles 19, and this wash water is intimately mixed with the pulpy unfilterable material and weakens the strength of the solution remaining therein, so that after the weak solution has been withdrawn, a very small percentage of the values remain in the unfilterable material. After this operation is completed, the unfilterable material still remains in the consistency of a pulp, and may be readily flowed or sluiced from the tank. This may be done by opening the discharge outlet and sluicing the pulpy mass out by means of a stream of water or by discharging sluicing water through the nozzles. After the unfilterable material has been removed or discharged, it is advantageous to pass water or air or both in a reverse direction through the canvas to remove therefrom any material which may have become embedded in the pores thereof, before the tank is again charged with pulp or slime.

In carrying out the process, it is evident that the filtering medium must be submerged in or covered by the material to be filtered, which, for convenience, I have designated pulp. By the term "submerged" I mean that the filtering medium is covered by the pulp, which is usually accomplished by charging the pulp into the tank in which the filtering medium is arranged.

I claim:

1. A filter comprising a vessel, a filtering medium arranged in said vessel, means for forcing the liquid being filtered through said medium and means for circulating the unfiltered material and projecting it directly against the surface of the filtering medium.

2. A filter comprising a vessel, a filtering medium arranged in said vessel, means for forcing the liquid being filtered through said medium and rotatable means for simultaneously directing a plurality of streams of liquid directly against the surface of said medium.

3. A filter comprising a vessel, a filtering medium arranged in said vessel, a hollow armed rotatable structure arranged adjacent the surface of said medium provided with discharge apertures, and means for forcing liquid through said arms and apertures and directly against the surface of said medium.

4. A filter comprising a vessel adapted to contain a quantity of pulp, a filtering medium arranged in said vessel below the level of the pulp, means for forcing the liquid being filtered through said medium, and rotatable means arranged in close relation to the surface of said medium adapted to project a plurality of streams of pulp directly against the surface of said medium.

5. A filter comprising a vessel, a filtering medium arranged in said vessel, a hollow armed rotatable structure arranged in close relation to the surface of said medium, a plurality of nozzles on said structure directed toward said surface, and means for forcibly discharging liquid through said nozzles.

6. A filter comprising a vessel, a filtering medium arranged in said vessel, a liquid supply pipe vertically arranged in said vessel, a hollow armed rotatable element suspended by said pipe in said vessel and disposed in close relation to said medium, a plurality of nozzles on said element directed toward the surface of said medium, and means for forcing liquid through said nozzles.

7. A filter comprising a vessel, a filtering medium arranged in said vessel, means for forcing the liquid being filtered through said medium, a pipe depending into said vessel, a hollow armed structure mounted on the lower end of said pipe, a plurality of nozzles on said structure directed toward the surface of said medium, a pump for forcing liquid through said pipe, and a suction pipe for said pump connected to said vessel.

8. A filter comprising a vessel, a filtering medium arranged in said vessel, means for forcing the liquid being filtered through said medium, a pump arranged externally of said vessel, a suction pipe for said pump connected to said vessel at a plurality of levels, valves between said suction pipe and said connection, a discharge pipe from said pump depending into the said vessel, a hollow armed member rotatably mounted on said depending pipe and in communication therewith, and a plurality of nozzles on said hollow armed member directed toward the surface of said medium.

9. A filter comprising a vessel adapted to contain pulp, a filtering medium arranged in said vessel, a stationary depending conductor in said vessel through which pulp passes downwardly, a rotatable structure adapted to be rotated by the reaction of the pulp passing therethrough from said conductor, mounted on said conductor and constructed and arranged to discharge pulp against the surface of said filtering medium.

10. A filter comprising a vessel, a filtering medium arranged in said vessel, means for forcing the liquid being filtered through said medium, a pump arranged externally of said vessel, a suction pipe for said pump connected to said vessel, an air cock on said suction pipe, a discharge pipe for said pump depending into said vessel a hollow armed structure rotatably mounted on said discharge pipe in close relation to the surface of said filtering medium and a plurality of nozzles on said structure directed toward the surface of the filtering medium.

11. A filter comprising a vessel adapted to contain a quantity of pulp, a filtering medium arranged in said vessel below the level of the pulp, means submerged in the pulp for discharging a plurality of jets of liquid directly against the surface of said medium and means for forcing the liquid being filtered through said medium.

12. A filter comprising a vessel adapted to contain a quanity of pulp, a filtering medium arranged in said vessel, a hollow rotatable structure arranged in close relation to said filtering medium, a plurality of flat nozzles on said structure inclined toward said filtering medium, and means for forcing pulp through said nozzles.

13. A filter comprising a vessel adapted to contain a quantity of pulp, a filtering medium arranged in said vessel, means for forcing the liquid being filtered through said filtering medium, a hollow armed rotatable structure arranged above and in close relation to said filtering medium, a plurality of flat discharge nozzles on said structure said nozzles being arranged that the jets discharging therefrom sweep the entire surface of said medium and means for withdrawing a portion of the pulp from said vessel and forcing it through said structure and nozzles.

14. A filter comprising a vessel, a filtering medium arranged in said vessel, and rotatable means suspended above said medium for projecting a plurality of streams of liquid directly against said medium.

15. A filter comprising a vessel, a filtering medium arranged in said vessel, a rotatable structure arranged in said vessel, a plurality of nozzles on said structure inclined toward the surface of said medium and having their discharge ends in close relation to said filtering medium, and means for forcing liquid through said nozzles and against the surface of said medium, the reaction of said discharging liquid causing the structure to rotate, whereby the discharging streams sweep the entire surface of the filtering medium.

16. A filter comprising a vessel, a filtering medium arranged in said vessel, means in said vessel for directing a plurality of streams of liquid against the surface of said medium and means for introducing air into said means.

17. A filter comprising a vessel, a flat filtering medium arranged in said vessel, a stationary conductor depending into said vessel, means for withdrawing liquid from the vessel and forcing it through said depending conductor, means adapted to be rotated by the discharge of liquid therefrom rotatably mounted on said conductor and arranged to discharge the liquid in a plurality of streams directly against the surface of said medium, and means for forcing the liquid being filtered through said medium.

In testimony whereof, I have hereunto set my hand at San Francisco California, this 4th day of March, 1914.

ALBERT E. VANDERCOOK.

In presence of—
H. G. Prost,
P. S. Pidwell.